Patented Aug. 18, 1953

2,649,427

UNITED STATES PATENT OFFICE 2,649,427

COMPOSITIONS CONTAINING A POLYMER OF ACRYLONITRILE AND N,N-DIMETHYL-ACETAMIDE

Carl S. Marvel, Urbana, Ill., assignor to E. I. du Pont de Nemours & Company, Wilmington, Del., a corporation of Delaware No Drawing. Application August 9, 1949, Serial No. 109,405

11 Claims. (Cl. 260—32.6)

1

This invention relates to new compositions of matter and shaped articles produced therefrom. More particularly, this invention relates to organic solvent solutions of polyacrylonitrile, i. e. polymerized acrylonitrile or polymerized vinyl cyanide and copolymers and interpolymers of acrylonitrile in which at least 85% by weight of the polymer is acrylonitrile and to the production of shaped articles from said solutions of said polymers.

Polyacrylonitrile and copolymers and interpolymers of acrylonitrile with other polymerizable substances, for example, vinyl or acrylic compounds, in which at least 85% by weight of the polymer is acrylonitrile, have been known for some time and recognized as possessing desirable physical and chemical properties including toughness and insolubility in and insensitivity to common organic solvents such as methyl or ethyl alcohol, acetone, ethyl ether, ethyl acetate, hydrocarbon solvents, chlorinated hydrocarbons and the like. Because of these facts, numerous attempts have been made to form these polymeric materials into yarns, films and other shaped articles.

A number of solvents have been found for polyacrylonitriles as exemplified in U. S. Patents 2,404,714—2,404,727. However, in striving for the production of high quality products, such as a high quality yarn, it has been found that many of the known solvents have disadvantages even though they are effective and useful solvents. For example, the use of dimethyl formamide, which is an excellent and useful solvent, leads, in dry spinning techniques, to the production of colored articles and means, such as stabilizing or bleaching, are required to produce articles free from undesirable color. Similarly, such a solvent as N,N-dimethylmethoxyacetamide is expensive and somewhat higher boiling than is desired for economic dry spinning procedures.

It is, therefore, an object of this invention to dissolve polyacrylonitrile or a copolymer or interpolymer of acrylonitrile in which at least 85% by weight of the polymer is acrylonitrile in a solvent which does not react with or decompose or discolor the polymer and which may be substantially completely removed at relatively low temperatures from the structures formed of such a solution.

It is another object of this invention to produce a solution of polyacrylonitrile or a copolymer or interpolymer of acrylonitrile in which at least 85% by weight of the polymer is acrylonitrile in a solvent which does not react with or

2 decompose or discolor the polymer, the solution being suitable for the formation of commercially useful, void-free articles of polyacrylonitrile, for example yarns which are suitable as textile yarns and films which are suitable as wrapping tissues.

It is another object of this invention to produce a solution of polyacrylonitrile, or a copolymer or interpolymer of acrylonitrile in which at least 85% by weight of the polymer is acrylonitrile in a volatile organic solvent which solution is stable over extended periods of time and is eminently suited for use in the manufacture of shaped articles such as yarns, films, tubes, straws, artificial horsehair, bristles and ribbons, or when highly concentrated, for use in the manufacture of molded articles.

It is a still further object of this invention to produce shaped articles and structures of polyacrylonitrile or copolymers or interpolymers of acrylonitrile in which at least 85% by weight of the polymer is acrylonitrile.

It is still another object of this invention to produce a shaped article or structure of polyacrylonitrile or copolymers or interpolymers of acrylonitrile in which at least 85% by weight of the polymer is acrylonitrile for example, a yarn, film, tube, bristle or the like which is tough, flexible, tenacious and free from voids.

Other objects of the invention will appear hereinafter.

The objects of this invention are accomplished in general by dissolving polyacrylonitrile or copolymers or interpolymers of acrylonitrile in which at least 85% by weight of the polymer is acrylonitrile in N,N-dimethylacetamide. The following examples in which parts, proportions and percentages are by weight illustrate applications of the principles of the invention.

*Example I*

Nine parts of polyacrylonitrile was heated in 126 parts of N,N-dimethylacetamide. The solution, containing 6⅔% by weight of polyacrylonitrile, was clear. The composition was useful in purification of the polymer, as by filtration or extraction, in effecting chemical changes in the polymer, as by hydrolysis or hydrogenation and, in the formation of shaped articles, such as films.

*Example II*

Five hundred and seventy parts of a copolymer of the composition 95/5 acrylonitrile/vinylpyridine was mixed with 2430 parts of redistilled N,N-dimethylacetamide forming a uniform slurry at room temperature. This slurry was heated at 90° C. for two hours. The transparent solution, containing 19% by weight of polyacrylonitrile, was filtered through a flannel and cotton batting filter, the filtered solution then heated to 90° C. and metered at a rate of 52 grams per minute through a candle filter to a spinneret of 120 holes 0.003" hole diameter immersed in a bath of water heated to 90° C. After passage of 58" through the hot water, during which the filaments were well coagulated, the yarn was passed approximately 180° around a stationary porcelain guide; thence several times around a driven drum and a cooperating idler roller having a surface speed of 108 yards per minute, thence carried over a "squirrel cage" drum and dropped into a slowly rotating collecting can. The yarn thus collected as a loose cake was washed free of solvent. The yarn was then drawn through a 10-foot long tube containing steam at 5 p. s. i. pressure to a draw ratio of 4.1X and finally passed over a curved plate heated to 160° C. for a period of 11 seconds during which the yarn dried. The yarn of good luster and color had physical properties as follows:

| Den. Fil. | Ten. Dry, g. p. d. | Elong. Dry, percent | Ten. Wet, g. p. d. | Elong. Wet, percent | Ten. Loop, g. p. d. | Elong. Loop, percent |
|---|---|---|---|---|---|---|
| 2.0 | 2.8 | 9.7 | 2.7 | 10.0 | 2.7 | 9.8 |

Example III

A spinning solution was made up by forming a slurry at room temperature from 46 parts of polyacrylonitrile of 70,000 molecular weight and 154 parts N,N-dimethylacetamide. The slurry after thorough mixing was heated in a liquid bath at 130° with stirring until a clear uniform solution, containing 23% by weight of polyacrylonitrile, was obtained. This solution was placed in a heated vertical cylindrical container equipped with a mechanically driven piston at the upper end. A spinneret assembly also heated was attached at the lower end. A spinneret having 5 holes 0.15 mm. in diameter was placed in the top end of a cylindrical heated air chamber or cell and a windup bobbin was placed below the bottom of this cell. The solution heated to 154° C. was forced through the spinneret into the heated cell whose walls were held at 484° C. The yarn coagulated as it passed axially through the cell and was collected on the windup bobbin at 30 yards per minute.

This yarn was subsequently drawn 4X from a heated drum and then was washed, skeined and heat-treated 1 hour at 125° C. The yarn had physical properties similar to those given in Example II.

Example IV

Two hundred parts of polyacrylonitrile of 70,000 molecular weight and 800 parts of N,N-dimethylacetamide were mixed in a manner similar to the other examples, then placed in a heated tube and forced by use of a piston through a 20 hole, 0.0035" diameter spinneret at a rate of 2.0 grams per minute. The 20% spin solution in the tube was heated to 150° C. The spinneret was immersed in a 20% aqueous calcium chloride bath heated to 94° C. After a 12" travel in this bath the yarn was wound up on a bobbin at a speed of 20 yards per minute. It was then washed and drawn 8X by carrying the wet yarn several times around a heated drum having a higher surface speed. This yarn was then twisted, skeined and heat-treated 1 hour at 125° C., and was found to have the following physical properties.

| Den. Fil. | Ten. Dry, g. p. d. | Elong. Dry, percent | Ten. Wet, g. p. d. | Elong. Wet, percent | Ten. Loop, g. p. d. | Elong. Loop, percent |
|---|---|---|---|---|---|---|
| 1.1 | 3.9 | 11.8 | 3.6 | 10.8 | 2.6 | 7.2 |

In a similar manner the following copolymers were dissolved in N,N-dimethylacetamide to give compositions which were useful in forming shaped articles: acrylonitrile with styrene, with dimethyl itaconate, with methyl vinyl ketone, with ethyl vinyl sulfone, with methacrylonitrile, with acrylic acid and with vinyl pyridines, such as 2-vinylpyridine.

To illustrate the decided advantages of N,N-dimethylacetamide the following experiments were performed:

Example V

Since basic impurities lead to yarns of inferior quality, redistilled N,N-dimethyl formamide (DMF) and redistilled N,N-dimethylacetamide (DMA) were distilled with a current of air passing through the system. Fractions were then tested for pH by the addition of water having a pH of 5.8. The results were as follows:

| Fraction | pH | |
|---|---|---|
|  | DMF | DMA |
| original | 8.5 | 5.2 |
| 1 | 9.6 | 5.9 |
| 2 | 9.1 | 5.6 |
| Residue | 8.2 | 5.2 |

From the above it can be seen that the solvent of this invention is very stable at elevated temperatures and by its use the adverse formation of basic impurities is avoided.

Example VI

Since procedures for forming shaped articles usually involve metal equipment containing iron, the stability of DMA was compared to DMF in respect to color formation by salts. Twenty cubic centimeters of each solvent was treated for 5 minutes, with shaking, with solid ferrous sulfate. The iron salt was removed by several filtrations and the solvents analyzed in a photelometer using a 1 cm. cell and a "heat" filter (Cenco #87312-B). The per cent transmission (% T) was read directly.

| FeSO4 | Percent T | |
|---|---|---|
|  | DMF | DMA |
| 0.1 g | 88.0 | 98.5 |
| 1.0 g | 16.5 | 65.5 |

The above illustrates that the solvent of this invention (DMA) may be used in iron containing equipment with less color formation than hitherto possible with DMF, an outstanding solvent for acrylonitrile polymers.

Example VII

In solutions of acrylonitrile polymers in DMA there is less color formation than in DMF solutions. Three per cent solutions of polyacrylonitrile in DMA and in DMF were heated at 100° C. and the color indices (C. I.) determined C. I.=−100 log A/100; A=average transmission for 3 wave lengths.

| Time | C. I. | |
|---|---|---|
| | DMF | DMA |
| 0 hrs | 7.0 | 7.3 |
| 1 hrs | 22.8 | 14.3 |
| 4 hrs | 40.1 | 22.6 |

Thus 4 hours' heating is required to give the same depth of color with DMA as develops in 1 hour with DMF. Similarly, there is less polymer degradation, as shown by viscosity measurements, in DMA solutions than in DMF solutions.

The polymers and copolymers of acrylonitrile for use in this invention can be prepared in any suitable manner such as those methods disclosed in U. S. Patent 2,160,054 or in U. S. Patents 2,404,714—2,404,727. The invention comprehends dissolving of acrylonitrile homopolymers and copolymers and interpolymers in which acrylonitrile is polymerized with other polymerizable substances such as, for example, compounds containing 1 or more ethylenic linkages which, in addition to those mentioned above may include vinyl acetate, vinyl chloride, isobutylene and butadiene. The solvent of this invention is eminently satisfactory for use with those polymers which contain a large amount of acrylonitrile, for example, polymers that contain in the polymer molecule at least 85% by weight of acrylonitrile. The solvent may be used in forming useful compositions with polymers having an average molecule weight between 15,000 and 250,000 as determined by viscosity data using the Staudinger equation. Such polymers are generally used in the manufacture of yarns and filaments. Generally, polymers having a molecular weight between 40,000 and 150,000 are preferred.

The above described solutions of the acrylonitrile polymers may be shaped in the form of filaments, yarns, films, tubes and like structures by apparatus and processes generally known in the art, the detailed operating conditions being suitably modified. The solutions are stable at room temperature and at elevated temperatures and may be used in producing shaped articles by extruding these solutions into an evaporative or coagulating medium. Film formation is readily achieved by casting the solution onto a smooth surface such as an endless steel band under the smoothing action of a doctor knife. The solvent may be removed either by the dry or evaporative method or by the wet method which utilizes a liquid coagulating bath. Similarly, the solutions may be used in the manufacture of moulded articles or as lacquer or coating compositions, these being especially useful in the coating of wire and electrical parts where high chemical and electrical resistance is important. In the preparation of shaped articles, solutions having a viscosity of from about 25 to 750 poises are preferred.

In addition to acting as a solvent, the solvent of this invention can also be used as a plasticizing agent when present in small amounts. Nonsolvent softeners such as glycerol may also be incorporated.

In preparing the compositions of this invention very small amounts of N,N - dimethylacetamide may be used, as, for example, 40% to 65% to produce compositions suitable for melt spinning. Smaller amounts, such as 5% to 40% or more, may be employed to produce compositions useful in obtaining molded articles. In producing solutions for dry spinning or wet spinning the amount of N,N-dimethylacetamide ranges preferably from 75% to 90%. Greater amounts may be used if desired, as shown in Example I.

The provision of this novel solvent, N,N-dimethylacetamide, is highly advantageous in that better slurry of the polymer at room temperature is obtained than hereto possible with known solvents. This eliminates the necessity for heat treating the polymer to harden it in order to get improved slurrying so that rapid solution is possible. The stability of this solvent is much greater than previously possessed by known solvents in all regards, especially in regard to color formation brought about by metal salts or by the development of impurities in the solvent at elevated temperatures. There is less adverse color formation and less degradation of the polymer in solutions of this invention than in solutions of the polymers in such a solvent as N,N-dimethylformamide. The possibilities for the commercialization of acrylonitrile polymers containing at least 85% acrylonitrile are decidedly enhanced by this invention.

The compositions of this invention may be used to produce the following:

Outdoor uses

Auto tops
Balloon fabric
Belts for combines
Fire hose covers
Horse harness
Harvester aprons
Lawn mower baskets
Life belts and preservers
Mosquito netting
Rainwear
Outdoor sewing thread
Sporting equipment
Sea bags

Staple

Blankets
Paper makers' felt
"Felt base" linoleum

Miscellaneous

Laundry net
Braided thread
Cable braid
Tablecloths

Fat fabrics

Crepe fabrics
Airplane head rest
Diaphragms
Lamination
Leader cloths
RR canvas
Shower curtains
Tracing cloth
Varnished thread
Varnished silk
Curtains
Shades
Ventubes (mining)
Lampshades
Bookbinding
Cloth top sport shoes
Camera bellows
Sacking
Tapestry
Mattress covers Tapes Zipper
Electrical
Venetian blind tapes
Watch straps

*Rubber covered*

Coated diaphragms
Conveyor belt

It was not expected that N,N-dimethylacetamide would be a solvent in view of U. S. 2,404,714 which pointed out that in amides a certain carbon to nitrogen ratio was essential. The solvent of this invention does not have the stated ratio. Further, related compounds are ineffective. For example, N,N-diethylacetamide and N,N-diethylformamide are non-solvents for polyacrylonitrile. The polymers of this invention possessing the aforesaid properties not possessed by other polymers require specific, unusual solvents.

Any departure from the procedure described herein which conforms to the principles of the invention is intended to be included within the scope of the claims below.

I claim:

1. A new composition of matter comprising a homogeneous liquid comprising a polymer of acrylonitrile, containing in the polymer molecule at least 85% by weight of acrylonitrile, and N,N-dimethylacetamide, said liquid containing at least about 10% by weight of said polymer, based on the weight of said liquid.

2. A new composition of matter comprising a homogeneous liquid comprising N,N-dimethylacetamide and polyacrylonitrile, said liquid containing at least about 10% of polyacrylonitrile.

3. A new composition of matter in accordance with claim 1 in which said polymer has a molecular weight of between 15,000 and 250,000.

4. A new composition of matter in accordance with claim 1 in which said polymer has a molecular weight of between 40,000 and 150,000.

5. A new composition of matter in accordance with claim 1 characterized in that said liquid has a viscosity within the range of 25 to 750 poises.

6. A new composition of matter in accordance with claim 1 in which said polymer is a copolymer of acrylonitrile and a vinylpyridine.

7. A new composition of matter in accordance with claim 1 in which said polymer is a copolymer of acrylonitrile and 2-vinylpyridine.

8. A new composition of matter comprising a homogeneous liquid comprising N,N-dimethylacetamide and polyacrylonitrile having a molecular weight between 15,000 and 250,000, said liquid containing at least about 10% of polyacrylonitrile, based on the weight of said liquid.

9. A new composition of matter comprising a homogeneous liquid comprising N,N-dimethylacetamide and polyacrylonitrile having a molecular weight of between 40,000 and 150,000, said liquid containing at least about 10% of polyacrylonitrile based on the weight of said liquid.

10. A new composition of matter in accordance with claim 1 in which said liquid contains about 40% to about 65% by weight of N,N-dimethylacetamide based on the weight of said liquid.

11. A new composition of matter in accordance with claim 1 in which said liquid contains about 75% to about 90% of N,N-dimethylacetamide based on the weight of said liquid.

CARL S. MARVEL.

References Cited in the file of this patent

UNITED STATES PATENTS

| Number | Name | Date |
|---|---|---|
| 1,986,854 | Reid | Jan. 8, 1935 |
| 2,404,714 | Latham | July 23, 1946 |
| 2,531,407 | D'Alelio | Nov. 28, 1950 |

OTHER REFERENCES

Marvel et al., J. A. C. S. 65 1647–1652 (1943).